US012503088B2

United States Patent
Ohashi et al.

(10) Patent No.: US 12,503,088 B2
(45) Date of Patent: Dec. 23, 2025

(54) MOTION MANAGER, CONTROL DEVICE OF BRAKE DEVICE, AND CONTROL METHOD

(71) Applicants: TOYOTA JIDOSHA KABUSHIKI KAISHA, Toyota (JP); ADVICS CO., LTD., Kariya (JP)

(72) Inventors: Yuta Ohashi, Toyota (JP); Kazuki Miyake, Okazaki (JP); Yusuke Suetake, Seto (JP); Atsushi Kuchinomachi, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 148 days.

(21) Appl. No.: 18/236,449

(22) Filed: Aug. 22, 2023

(65) Prior Publication Data
US 2024/0101084 A1 Mar. 28, 2024

(30) Foreign Application Priority Data

Sep. 27, 2022 (JP) ................. 2022-153826

(51) Int. Cl.
*B60T 8/172* (2006.01)
*B60T 7/22* (2006.01)

(52) U.S. Cl.
CPC .............. *B60T 8/172* (2013.01); *B60T 7/22* (2013.01); *B60T 2201/024* (2013.01); *B60T 2210/32* (2013.01)

(58) Field of Classification Search
CPC ............................ B60T 7/22; B60T 2201/024
See application file for complete search history.

(56) References Cited

U.S. PATENT DOCUMENTS

| | | | |
|---|---|---|---|
| 6,267,194 B1 * | 7/2001 | Bullinger | B60T 8/00 180/275 |
| 6,286,617 B1 * | 9/2001 | DeLuca | B60T 13/662 180/282 |
| 8,260,498 B2 * | 9/2012 | Deng | B60W 10/20 701/72 |
| 9,789,858 B1 | 10/2017 | Parikh | |
| 11,036,234 B2 | 6/2021 | Egnor et al. | |
| 11,608,075 B2 * | 3/2023 | Suzuki | B60W 40/107 |
| 2003/0106732 A1 * | 6/2003 | Watanabe | B60T 7/22 180/169 |

(Continued)

FOREIGN PATENT DOCUMENTS

| | | |
|---|---|---|
| EP | 4 032 761 A1 | 7/2022 |
| JP | 2010-179873 A | 8/2010 |

(Continued)

*Primary Examiner* — Phutthiwat Wongwian
*Assistant Examiner* — Brian R Kirby
(74) *Attorney, Agent, or Firm* — Oliff PLC

(57) ABSTRACT

A motion manager mounted on a vehicle includes a processor. The processor receives, from an application that has determined that another object will collide with the vehicle, a motion request indicating that an additional braking force is needed, when the vehicle is stopped. The processor generates an instruction value for causing a brake device to generate a greater braking force than before the motion request is received, when the motion request indicating that the additional braking force is needed is received.

8 Claims, 3 Drawing Sheets

(56) References Cited

U.S. PATENT DOCUMENTS

| | | | |
|---|---|---|---|
| 2004/0122573 A1* | 6/2004 | Mizutani | B60T 8/3275 701/45 |
| 2005/0162012 A1* | 7/2005 | Sakai | B60T 8/56 303/191 |
| 2010/0006363 A1* | 1/2010 | Zagorski | B60T 7/22 180/275 |
| 2010/0241311 A1* | 9/2010 | Baumann | G08G 1/162 701/36 |
| 2011/0264347 A1* | 10/2011 | Cetinkaya | B60T 7/22 701/70 |
| 2011/0264348 A1* | 10/2011 | Cetinkaya | B60T 7/22 701/70 |
| 2012/0296542 A1* | 11/2012 | Nitz | B60K 31/0008 701/70 |
| 2013/0024075 A1* | 1/2013 | Zagorski | B60T 7/22 701/1 |
| 2013/0110370 A1* | 5/2013 | Inomata | B60K 31/0008 701/70 |
| 2020/0070849 A1* | 3/2020 | Suzuki | B60W 10/20 |
| 2022/0219711 A1 | 7/2022 | Ohashi et al. | |
| 2022/0289219 A1 | 9/2022 | Miyake et al. | |

FOREIGN PATENT DOCUMENTS

| | | | | |
|---|---|---|---|---|
| JP | 2020-032894 A | 3/2020 | | |
| JP | 2020-083087 A | 6/2020 | | |
| JP | 2022-139254 A | 9/2022 | | |
| WO | WO-2009043417 A1 * | 4/2009 | | B60Q 1/444 |
| WO | WO-2013115246 A1 * | 8/2013 | | B60R 16/02 |

* cited by examiner

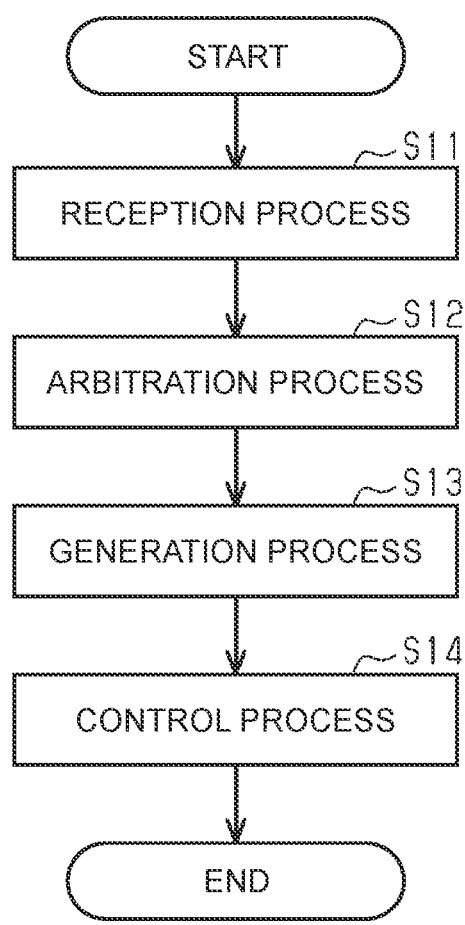

MOTION MANAGER, CONTROL DEVICE OF BRAKE DEVICE, AND CONTROL METHOD

CROSS-REFERENCE TO RELATED APPLICATION

This application claims priority to Japanese Patent Application No. 2022-153826 filed on Sep. 27, 2022, incorporated herein by reference in its entirety.

BACKGROUND

1. Technical Field

The present disclosure relates to a motion manager, a control device of a brake device, and a control method.

2. Description of Related Art

Japanese Unexamined Patent Application Publication No. 2020-32894 (JP 2020-32894 A) describes a motion manager. The motion manager is mounted on a vehicle. The motion manager includes a reception unit and a generation unit. The reception unit receives a motion request from an application. The generation unit generates, for example, an instruction value of an operation request to be output to a brake control unit, based on the motion request received by the reception unit.

SUMMARY

The motion manager described in JP 2020-32894 A, for example, receives an acceleration requested for the vehicle from the application when the vehicle is traveling. Then, the motion manager generates the instruction value of the operation request so that the acceleration can be realized. On the other hand, the technique described in JP 2020-32894 A does not focus at all on what kind of process the motion manager should perform when the vehicle is stopped and an external force is applied to the vehicle.

One aspect of the present disclosure is a motion manager configured to be mounted on a vehicle including one or more processors configured to: receive a motion request from an application; and generate an instruction value of an operation request for a brake control unit that controls a brake device, based on the received motion request. The one or more processors are further configured to receive, from the application that has determined that an object will collide with the vehicle, the motion request indicating that an additional braking force is needed, when the vehicle is stopped, and generate the instruction value for causing the brake device to generate a greater braking force than before the motion request is received, when the motion request indicating that the additional braking force is needed is received.

Another aspect of the present disclosure is a control device configured to control a brake device of a vehicle. The control device includes a motion manager that includes one or more processors configured to: receive a motion request from an application; and generate an instruction value of an operation request for a brake control unit that controls the brake device, based on the received motion request. The one or more processors are further configured to: receive, from the application that has determined that an object will collide with the vehicle, the motion request indicating that an additional braking force is needed, when the vehicle is stopped, and generate the instruction value for causing the brake device to generate a greater braking force than before the motion request is received, when the motion request indicating that the additional braking force is needed is received.

According to each configuration described above, a reception unit receives, from an application that has determined that another object will collide with a vehicle, a motion request indicating that additional braking force is needed, when the vehicle is stopped. At this time, since the vehicle is stopped, the brake device is generating constant braking force. However, it is only necessary that the braking force at this time is sufficient enough to stop the vehicle. Therefore, the braking force at this time may not be so great. On the other hand, the generation unit generates an output signal for causing the vehicle to generate a greater braking force than before the motion request is received, when the reception unit receives the motion request indicating that the additional braking force is needed. Therefore, the vehicle generates a greater braking force than before receiving the motion request. This suppresses the vehicle from moving due to the impact when another object collides with the vehicle.

Still another aspect of the present disclosure is executed by a computer mounted on a vehicle for controlling a brake device of the vehicle. The control method includes: receiving a motion request from an application; and generating an instruction value of an operation request for controlling the brake device, based on the received motion request. The control method further includes: receiving, from the application that has determined that an object will collide with the vehicle, the motion request indicating that an additional braking force is needed, when the vehicle is stopped, and generating the instruction value for causing the brake device to generate a greater braking force than before the motion request is received, when the motion request indicating that the additional braking force is needed is received.

According to the configuration described above, the motion request indicating that an additional braking force is needed is received from the application that has determined that another object will collide with the vehicle, when the vehicle is stopped. At this time, since the vehicle is stopped, the brake device is generating constant braking force. However, it is only necessary that the braking force at this time is sufficient enough to stop the vehicle. Therefore, the braking force at this time may not be so great. On the other hand, according to the configuration described above, an output signal is generated for causing the vehicle to generate a greater braking force than before the motion request is received, when the motion request indicating that the additional braking force is needed is received. Therefore, the vehicle generates a greater braking force than before receiving the motion request. This suppresses the vehicle from moving due to the impact when another object collides with the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing a control method of the brake device.

DETAILED DESCRIPTION OF EMBODIMENTS

Embodiment

An embodiment of a motion manager, a control device that includes the motion manager, and a control method is described below. The control device that includes the motion manager is described below with reference to the drawings.

Outline of Vehicle

Figure 1:
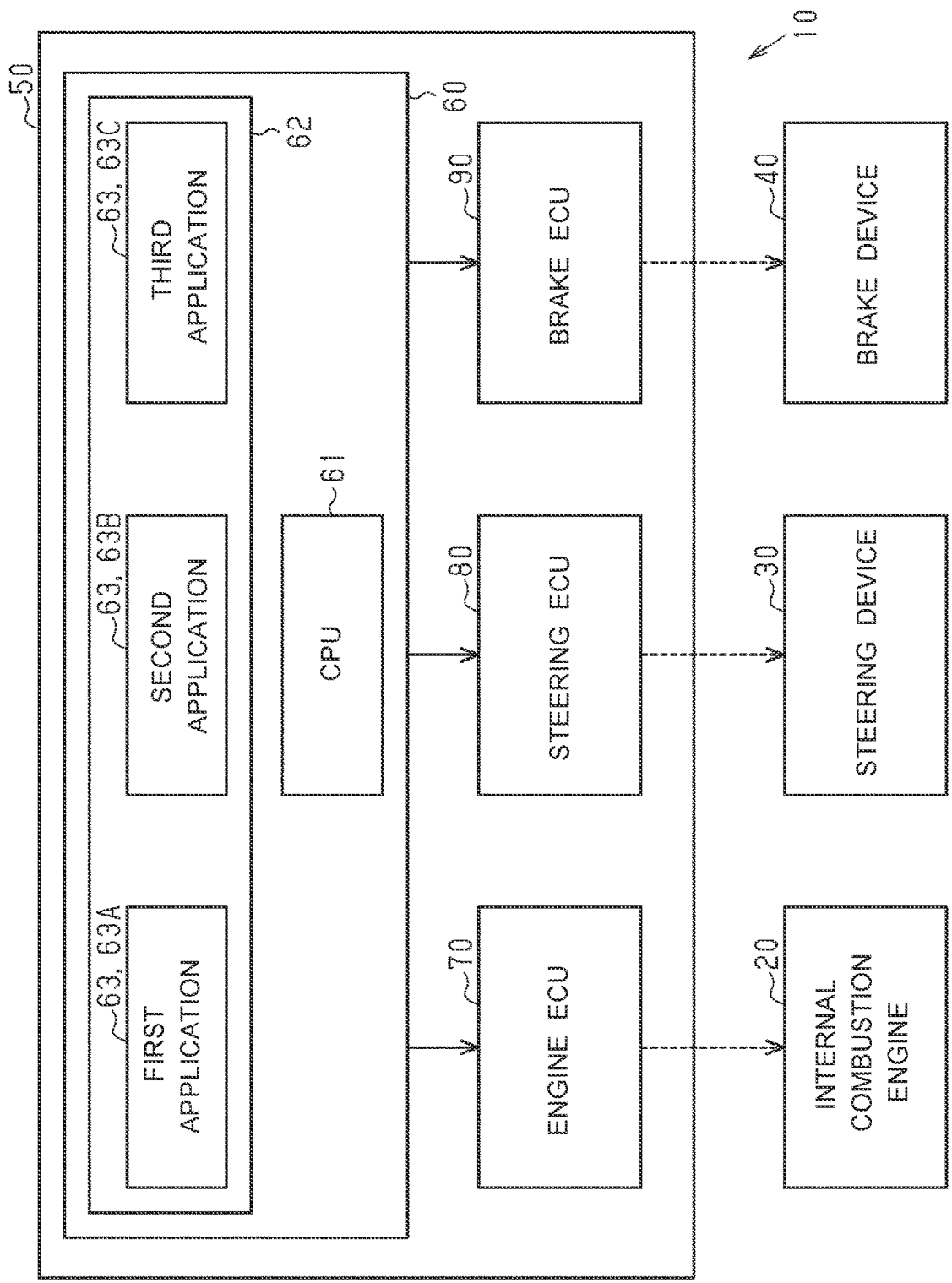
FIG. 1 is a schematic diagram showing an outline of a vehicle.

As shown in FIG. 1, a vehicle 10 includes an internal combustion engine 20, a steering device 30, a brake device 40, and a control device 50.

The internal combustion engine 20 is a driving source of the vehicle 10. Although not shown, the internal combustion engine 20 includes a plurality of actuators such as a throttle valve, a fuel injection valve, and an ignition device. The control device 50 controls the actuators described above. Accordingly, the internal combustion engine 20 burns fuel and drives the vehicle 10.

The steering device 30 changes the steering angle of a steering wheel of the vehicle 10. The steering device 30 includes an electric power steering system. The control device 50 controls the actuator. Accordingly, the electric power steering system assists the driver's steering operation. Further, the electric power steering system performs a fine adjustment of the driver's steering operation amount or an adjustment of the steering angle without the driver's operation, by the control of the actuator performed by the control device 50.

Figure 2:
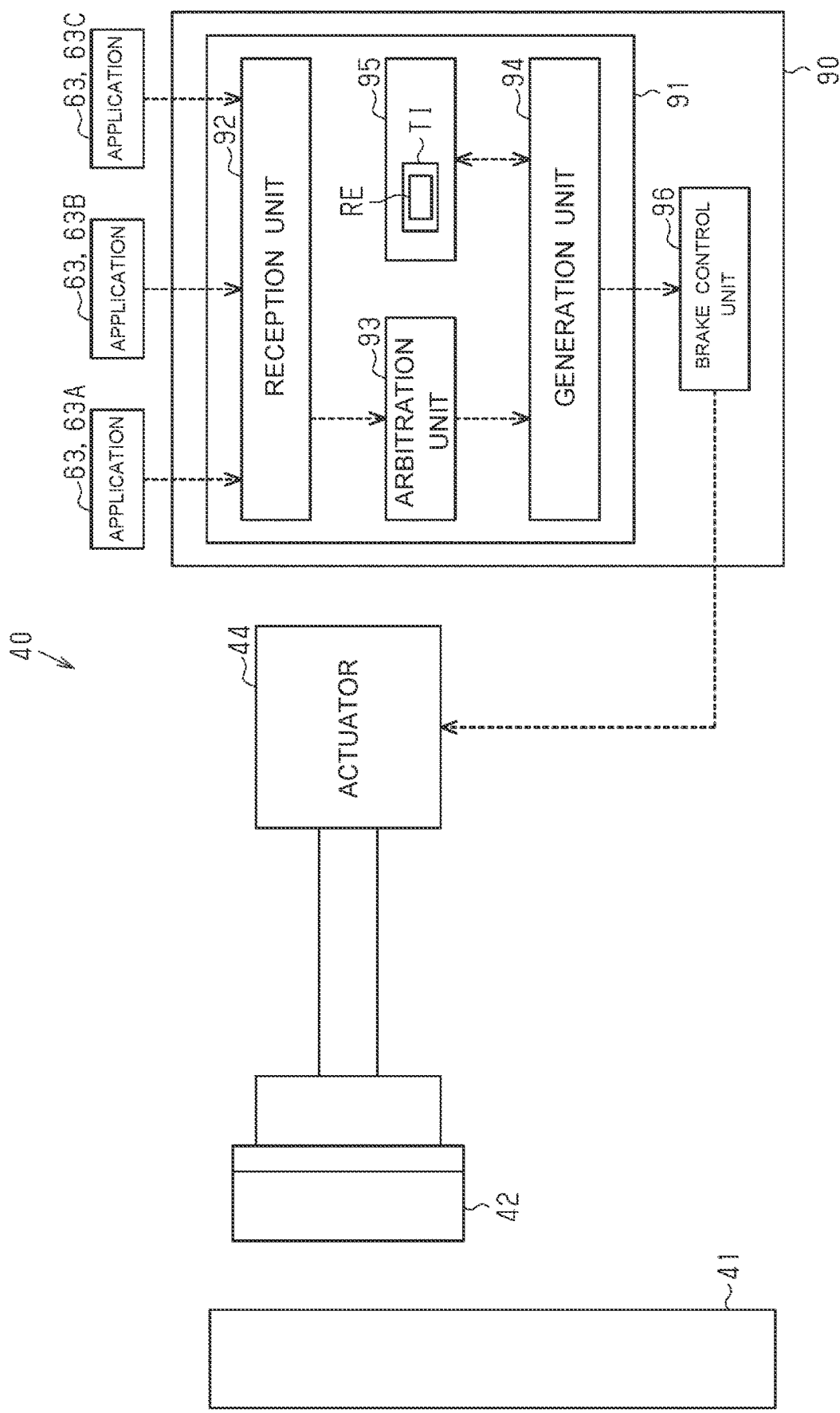
FIG. 2 is a schematic diagram showing a brake electronic control unit (ECU) and a brake device.

The brake device 40 is provided in each wheel of the vehicle 10. The brake device 40 is a dish brake that uses hydraulic pressure to generate braking force. As shown in FIG. 2, the brake device 40 includes a disk 41, a brake pad 42, and an actuator 44 that applies hydraulic pressure to the brake pad 42. That is, the actuator 44 outputs hydraulic pressure. The disk 41 is a rotating body that rotates integrally with the wheel of the vehicle 10. The brake pad 42 is a friction material supported by the vehicle body of the vehicle 10. The hydraulic pressure from the actuator 44 is controlled by the control device 50. The brake device 40 generates braking force in the vehicle 10 by bringing the disk 41 and the brake pad 42 into contact with each other.

As shown in FIG. 1, the control device 50 includes an advanced safety electronic control unit (ECU) 60, an engine ECU 70, a steering ECU 80, and a brake ECU 90. Each ECU can transmit and receive signals with each other via an internal bus (not shown).

The advanced safety ECU 60 realizes functions related to the driver assistance of the vehicle 10. Specifically, the advanced safety ECU 60 includes a central processing unit (CPU) 61 and a read only memory (ROM) 62. The ROM 62 stores a plurality of applications 63. Here, among the applications 63, three applications 63 are assumed to be a first application 63A, a second application 63B, and a third application 63C.

The first application 63A is an application to detect, when the vehicle 10 is stopped, that another object such as another vehicle will collide with the vehicle 10 before the collision, by using a sensor such as a camera (not shown). More specifically, the first application 63A is an application that detects the collision with the vehicle 10 using an image of the other vehicle acquired by the camera. That is, the first application 63A is an application that is executed only when the vehicle 10 is stopped.

The second application 63B and the third application 63C are programs that realize the functions of an advanced driver assistance system. An example of the second application 63B and the third application 63C is an adaptive cruise control (ACC) application for follow-up traveling while maintaining a constant inter-vehicle distance from a preceding vehicle. The ACC application requests each actuator mounted on the vehicle 10 to accelerate and decelerate, so that the vehicle 10 can travel while maintaining a constant distance from the preceding vehicle.

Further, another example of the second application 63B and the third application 63C is an auto speed limiter (ASL) application that recognizes a vehicle velocity limit and maintains the velocity of the vehicle 10 at or below the vehicle velocity limit. Furthermore, another example of the second application 63B and the third application 63C is a collision damage reducing brake application that automatically brakes the vehicle 10 to reduce the damage of a collision, that is, a so-called autonomous emergency braking (AEB) application. In addition, another example of the second application 63B and the third application 63C is a lane keeping support application that maintains the lane in which the vehicle 10 is traveling, that is, a so-called lane keeping assist (LKA) application. Therefore, the second application 63B and the third application 63C are applications that are executed only when the vehicle 10 is traveling.

The CPU 61 acquires detected values from a plurality of sensors (not shown) mounted on the vehicle 10. The CPU 61 uses the detected values from the sensors to execute each application 63 that is stored in the ROM 62. When the CPU 61 executes each application 63, the CPU 61 outputs a motion request corresponding to the application 63 so that the functions of each application 63 can be realized. Note that the CPU 61 may also execute the applications 63 at the same time. In this case, the CPU 61 outputs an individual motion request for each executed application 63.

The CPU 61 outputs each motion request to an ECU that includes a control unit of the actuator that needs to be controlled in order to realize the functions of each application 63. Specifically, the CPU 61 outputs the motion request to one or more ECUs selected from the engine ECU 70, the steering ECU 80, and the brake ECU 90.

The CPU 61 executes the second application 63B and the third application 63C, thereby outputting a motion request to the engine ECU 70. The motion request is a value indicating the requested acceleration to be generated in the vehicle 10. Further, the CPU 61 executes the second application 63B and the third application 63C, thereby outputting a motion request to the steering ECU 80. The motion request is a value indicating the steering angle of the vehicle 10. Furthermore, the CPU 61 executes the second application 63B and the third application 63C, thereby outputting a motion request to the brake ECU 90. The motion request is a value indicating the requested acceleration to be generated in the vehicle 10.

On the other hand, the CPU 61 executes the first application 63A, thereby outputting a motion request to the brake ECU 90. The motion request is a signal indicating that the vehicle 10 needs additional braking force. Whether the vehicle 10 needs additional braking force is represented by a so-called flag. The ON state flag is a signal indicating that the vehicle 10 needs additional braking force. On the other hand, the OFF state flag is a signal indicating that the vehicle 10 does not need additional braking force. Thus, the motion request output from the first application 63A to the brake ECU 90 is a signal that alternatively indicates whether additional braking force is needed.

The motion request output by the CPU 61 as described above does not directly indicate the instruction value output to the actuator 44 of the brake device 40, for example. That is, the motion request is common to the brake device 40, and does not change according to the type of the brake device 40, for example. On the other hand, the motion request may differ among devices with different functions, such as the internal combustion engine 20, the steering device 30, and the brake device 40.

The engine ECU 70 is a computer that includes a CPU and a ROM (not shown). The CPU of the engine ECU 70 controls the internal combustion engine 20 by executing a program that is stored in the ROM. That is, the engine ECU 70 is a control device that controls the internal combustion engine 20. In particular, the engine ECU 70 controls the internal combustion engine 20 based on the motion request from the advanced safety ECU 60.

The steering ECU 80 is a computer that includes a CPU and a ROM (not shown). The CPU of the steering ECU 80 controls the steering device 30 by executing a program that is stored in the ROM. That is, the steering ECU 80 is a control device that controls the steering device 30. In particular, the steering ECU 80 controls the steering device 30 based on the motion request from the advanced safety ECU 60.

The brake ECU 90 is a computer that includes a CPU and a ROM (not shown). The CPU of the brake ECU 90 controls the brake device 40 by executing a program that is stored in the ROM. That is, the brake ECU 90 is a control device that controls the brake device 40. In particular, the brake ECU 90 controls the brake device 40 based on the motion request from the advanced safety ECU 60. The operation of the brake ECU 90 is described below in detail.

Brake ECU

The operation of the brake ECU 90 when each application 63 that is stored in the advanced safety ECU 60 is executed is described below.

As shown in FIG. 2, the brake ECU 90 includes a motion manager 91 and a brake control unit 96. Although not shown, the brake ECU 90 includes the CPU and the ROM. The CPU of the brake ECU 90 realizes the functions of the motion manager 91 and the brake control unit 96 by executing a program for the motion manager and a program for a brake control that are stored in the ROM.

Specifically, as shown in FIG. 3, the CPU of the brake ECU 90 executes a reception process S11, an arbitration process S12, a generation process S13, and a control process S14 by executing the program that is stored in the ROM. Therefore, the CPU of the brake ECU 90 functions as a reception unit 92, an arbitration unit 93, and a generation unit 94 in the motion manager 91. In addition, the CPU of the brake ECU 90 functions as the brake control unit 96.

The ROM of the brake ECU 90 prestores type information TI of the brake device 40 to be controlled by the brake control unit 96. The type information TI is information for identifying the type of the brake device 40 that is actually mounted on the vehicle 10 from among multiple categories of the brake device 40 that can be mounted on the vehicle 10.

Further, the ROM of the brake ECU 90 stores a plurality of instruction value maps in which each motion request and the instruction value of an operation request for realizing the motion request correspond to each other. The instruction value is a signal indicating the magnitude of the hydraulic pressure that is output by the actuator 44. The ROM of the brake ECU 90 stores the instruction value map for each type information TI. Furthermore, the type information TI of the brake device 40 includes a restriction RE for each type of the brake device 40. The restriction RE includes information on an upper limit value of the braking force that the brake device 40 can output. Further, the restriction RE includes an upper limit value of the output of the actuator 44 for setting the upper limit value of the braking force that the brake device 40 can output.

As shown in FIG. 3, the brake ECU 90 starts controlling the brake device 40 when the motion request is input from the advanced safety ECU 60 in order to realize the functions of the advanced driver assistance system. When the control of the brake device 40 is started, the brake ECU 90 first performs the reception process S11. In the reception process S11, the reception unit 92 performs a process. The motion request from the first application 63A is assumed to be a first motion request, the motion request from the second application 63B is assumed to be a second motion request, and the motion request from the third application 63C is assumed to be a third motion request.

Vehicle Traveling State

First, the operation of the brake ECU 90 when the vehicle 10 is not stopped, that is, when the vehicle 10 is traveling is described. When the vehicle 10 is not stopped, the first application 63A described above is not executed. On the other hand, the second application 63B and the third application 63C are executed.

As shown in FIG. 2, the reception unit 92 can receive the motion requests corresponding to individual applications 63 from the advanced safety ECU 60. In addition, as described above, the advanced safety ECU 60 may also execute the applications 63 at the same time. In this case, the reception unit 92 receives a plurality of motion requests and outputs the motion requests to the arbitration unit 93. Specifically, the reception unit 92 receives the second motion request and the third motion request, and outputs the second motion request and the third motion request to the arbitration unit 93. On the other hand, when the vehicle 10 is not stopped, the first application 63A is not executed. Therefore, the reception unit 92 does not receive the first motion request.

After that, as shown in FIG. 3, the brake ECU 90 advances the process to the arbitration process S12. In the arbitration process S12, the arbitration unit 93 performs a process. As shown in FIG. 2, the arbitration unit 93 arbitrates the motion request received by the reception unit 92. When there is only one motion request that is received by the reception unit 92, the arbitration unit 93 selects that motion request. On the other hand, when there are multiple motion requests that are received by the reception unit 92, the arbitration unit 93 selects the motion request that provides the largest requested acceleration on the negative side, thereby arbitrating the motion requests. Specifically, when the requested acceleration indicated by the third motion request is larger on the negative side than the requested acceleration indicated by the second motion request, the arbitration unit 93 selects the third motion request to arbitrate the two motion requests. In other words, the arbitration unit 93 arbitrates by selecting a motion request that provides a greater braking force.

After that, as shown in FIG. 3, the brake ECU 90 advances the process to the generation process S13. In the generation process S13, the generation unit 94 performs a process. As shown in FIG. 2, the generation unit 94 generates an instruction value of the operation request to be output to the brake control unit 96 that is mounted on the vehicle 10, based on the arbitration result by the arbitration unit 93. At this time, the generation unit 94 generates the instruction value of the operation request using the type information TI of the brake device 40 and the instruction value map corresponding to the type information TI that are stored in a storage unit 95.

It is assumed that, for example, the third motion request from the third application 63C is selected as the motion request in the arbitration by the arbitration unit 93. Even in the same third motion request, when the type of the actuator 44 is different, for example, the instruction value for realizing the third motion request may differ. For example, even when the instruction value for realizing the third motion request with a "type A" actuator 44 is "X value," the instruction value for realizing the third motion request with a "type B" actuator 44 may be "Y value." Accordingly, the generation unit 94 identifies the instruction value map corresponding to the type information TI. Then, the generation unit 94 identifies the value corresponding to the motion request that is arbitrated by the arbitration unit 93 in the identified instruction value map, and generates the value as the instruction value of the operation request.

Note that, as described above, when the vehicle 10 is not stopped, the reception unit 92 does not receive the first motion request. Therefore, when the vehicle 10 is not stopped, the generation unit 94 does not generate the instruction value of the operation request according to the first motion request.

After that, as shown in FIG. 3, the brake ECU 90 advances the process to the control process S14. In the control process S14, the brake control unit 96 performs a process. As shown in FIG. 2, the brake control unit 96 outputs the instruction value of the operation request that is generated by the generation unit 94 to the actuator 44 of the brake device 40. As a result, the brake control unit 96 controls the brake device 40 by driving the actuator 44. After that, the brake ECU 90 ends the series of processes.

Vehicle Stopped State

Next, the operation of the brake ECU 90 when the vehicle 10 is stopped is described. When the vehicle 10 is stopped, the actuator 44 of the brake device 40 is in a state of outputting hydraulic pressure at a certain level or higher. At this time, the CPU 61 of the advanced safety ECU 60 may detect that another vehicle will collide with the vehicle 10, by executing the first application 63A. In this case, the CPU 61 outputs to the brake ECU 90 from the first application 63A the first motion request indicating that the vehicle 10 needs additional braking force.

First, as shown in FIG. 3, the brake ECU 90 performs the reception process S11. In the reception process S11, the reception unit 92 performs a process. As shown in FIG. 2, the reception unit 92 receives the first motion request from the first application 63A from the advanced safety ECU 60.

After that, as shown in FIG. 3, the brake ECU 90 advances the process to the arbitration process S12. In the arbitration process S12, the arbitration unit 93 performs a process. As shown in FIG. 2, the arbitration unit 93 arbitrates the motion request received by the reception unit 92. When receiving the first motion request, the arbitration unit 93 arbitrates by selecting the first motion request regardless of the presence or absence of other motion requests.

After that, as shown in FIG. 3, the brake ECU 90 advances the process to the generation process S13. In the generation process S13, the generation unit 94 performs a process. As shown in FIG. 2, the generation unit 94 generates an instruction value of the operation request to be output to the brake control unit 96, based on the arbitration result by the arbitration unit 93. At this time, the generation unit 94 generates an instruction value of an operation request for causing the brake device 40 to generate a greater braking force than before receiving the first motion request. Specifically, when realizing the first motion request, the generation unit 94 generates a specific instruction value, which is a value of a predetermined instruction value. More specifically, the generation unit 94 refers to the restriction RE of the brake device 40 stored in the storage unit 95. Then, when receiving the first motion request indicating that additional braking force is needed, the generation unit 94 generates the specific instruction value so that the braking force of the brake device 40 becomes smaller than the upper limit. Specifically, the generation unit 94 sets a value slightly smaller than the upper limit value of the output of the actuator 44 as the specific instruction value. When the instruction value of the operation request to the actuator 44 is the specific instruction value, the braking force of the brake device 40 serves as a braking force that locks the rotation of the wheels of the vehicle 10.

After that, as shown in FIG. 3, the brake ECU 90 advances the process to the control process S14. In the control process S14, the brake control unit 96 performs a process. As shown in FIG. 2, the brake control unit 96 outputs the specific instruction value that is generated by the generation unit 94 to the actuator 44 of the brake device 40. As a result, the brake control unit 96 controls the brake device 40 by driving the actuator 44. The braking force of the brake device 40 serves as a braking force that locks the rotation of the wheels of the vehicle 10. After that, the brake ECU 90 ends the current series of processes.

Operations of Embodiment

According to the above embodiment, while the vehicle 10 is stopped, the reception unit 92 of the brake ECU 90 receives the first motion request indicating that additional braking force is needed. At this time, the generation unit 94 generates an instruction value of an operation request for realizing additional braking force based on the first motion request in preparation for the collision of another vehicle with the vehicle 10.

Effects of Embodiment (1) According to the above embodiment, the reception unit 92 receives a first motion request indicating that additional braking force is needed from the first application 63A that determined that another object such as another vehicle will collide with the vehicle 10 when the vehicle 10 is stopped. At this time, since the vehicle 10 is stopped, the brake device 40 is generating constant braking force. However, it is only necessary that the braking force at this time is sufficient enough to stop the vehicle 10. Therefore, the braking force at this time may not be so great. On the other hand, the generation unit 94 generates an instruction value of an operation request for causing the vehicle 10 to generate a greater braking force than before the first motion request is received, when the reception unit 92 receives the first motion request indicating that the additional braking force is needed. Therefore, the vehicle 10 generates a greater braking force than before receiving the first motion request. This suppresses the vehicle 10 from moving due to the impact when another object collides with the vehicle 10.

(2) According to the above embodiment, the storage unit 95 stores, in advance, the type information TI of the brake device 40. When a motion request is received, the generation unit 94 generates an instruction value of an operation request based on the type information TI of the brake device 40, which is stored in the storage unit 95. Therefore, even when the mode of the motion request that is received from the application 63 does not match the type, structure, etc. of the brake device 40, the instruction value of the operation request can be generated that causes the vehicle 10 to generate a braking force. Therefore, when developing the applications 63, the development may be performed with a unified standard. That is, there is no need to develop the application 63 for each type and structure of the brake device 40.

(3) According to the above embodiment, the type information TT of the brake device 40 includes the restriction RE of the brake device 40. Further, the restriction RE includes information on an upper limit value of the braking force that the brake device 40 can output. Then, when receiving the first motion request indicating that additional braking force is needed, the generation unit 94 generates an instruction value of an operation request so that the braking force of the brake device 40 becomes the upper limit value or lower. Therefore, even when the first motion request indicating that the additional braking force is needed is received, an instruction value of an operation request that provides a braking force that exceeds the upper limit value for the brake device 40 is not generated. Therefore, damage of the brake device 40 can be suppressed.

(4) According to the above embodiment, the generation unit 94 receives the first motion request indicating that additional braking force is needed. In this case, based on the type information TI of the brake device 40, an instruction value is generated as a specific instruction value so that the braking force of the brake device 40 serves as a braking force that locks the rotation of the wheels of the vehicle 10. Therefore, the brake device 40 can generate a braking force so as to lock the wheels of the vehicle 10. When the wheels of the vehicle 10 are locked, the wheels rub against the ground when the vehicle 10 is moved by a collision with another vehicle. As a result, when another vehicle collides with the vehicle 10, the collision energy can be consumed by the friction between the wheels of the vehicle 10 and the ground.

(5) According to the above embodiment, when the vehicle 10 is not stopped, the generation unit 94 does not generate an instruction value of an operation request corresponding to the first motion request indicating that additional braking force is needed. Therefore, when the vehicle 10 is not stopped, the process of realizing the motion request from the second application 63B and the third application 63C is not interfered.

(6) According to the above embodiment, when receiving the first motion request, the arbitration unit 93 arbitrates by selecting the first motion request regardless of the presence or absence of other motion requests. Therefore, it is possible to suppress the additional braking force from not being applied.

Other Embodiments

The above embodiment can be implemented with the following modifications. The above embodiment and the following modifications can be combined with each other within a technically consistent range to be implemented.

The vehicle 10 may include a motor that serves as a driving source for the vehicle 10 in addition to or instead of the internal combustion engine 20. In this case, the control device 50 may include a motor ECU that controls the motor in addition to or instead of the engine ECU 70.

The type and the structure of the brake device 40 are not limited to the structure of the above embodiment. When the storage unit 95 stores the type information TI of the actuator 44 of the brake device 40, the motion manager 91 can generate an operation request in accordance with the type and the structure of the brake device 40.

The actuator 44 is not limited to an actuator that outputs hydraulic pressure. The type may be appropriately changed to a different type according to the braking force that is generated by the brake device 40, etc. Even in this case, when the storage unit 95 stores the type information TI of the brake device 40, the generation unit 94 can generate an appropriate output value of the operation request.

Even when the motion manager 91 controls the brake device 40, the configuration is not limited to a case where the motion manager 91 is included in the brake device 40. For example, the motion manager 91 may be included in the advanced safety ECU 60. Further, for example, the control device 50 may include a management ECU that collectively manages the internal combustion engine 20, the steeling device 30, and the brake device 40. In this case, the motion manager 91 may be included in the management ECU.

The control device 50 may be divided into a device that includes the motion manager 91 and a device that includes the brake control unit 96. That is, the CPU that executes the reception process S11, the arbitration process S12, and the generation process S13 may be different from the CPU that executes the control process S14.

In the above embodiment, the applications 63 are executed by the same CPU 61 in the advanced safety ECU 60, but the present disclosure is not limited to this. Individual applications 63 may be executed by different CPUs.

The applications 63 are not limited to the applications exemplified in the above embodiment. For example, the application 63 may be an intelligent speed assistance (ISA) application that controls the velocity of the vehicle 10 so that the velocity does not exceed the upper limit velocity.

The first application 63A may also be executed while the vehicle 10 is traveling. In this case, the arbitration unit 93 may arbitrate by selecting the first motion request from the first application 63A while the vehicle 10 is traveling. Further, in this case, when the vehicle 10 is not stopped, the generation unit 94 may or need not generate an instruction value according to the first motion request.

The arbitration unit 93 need not arbitrate the motion request based on the magnitude of the output value of the operation request. For example, the arbitration unit 93 may arbitrate by selecting a signal from the application 63 with a high degree of urgency. More specifically, for example, when the reception unit 92 receives the motion requests from the AEB application and the LKA application, the arbitration unit 93 may arbitrate by selecting the motion request from the AEB application with a high degree of urgency.

In the above embodiment, the generation unit 94 uses the instruction value map that is stored in the storage unit 95 to generate the instruction value of the operation request, but the present disclosure is not limited to this. For example, instead of using the instruction value map, the generation unit 94 may multiply the reference value by a coefficient according to the type of the actuator 44 to generate the instruction value.

The braking force of the brake device 40 need not be a braking force that locks the rotation of the wheels of the vehicle 10 by the instruction value of the operation request generated when the generation unit 94 receives the first motion request. It is at least necessary that the generation unit 94 generates an instruction value of an operation request for causing the brake device 40 to generate a greater braking force than before receiving the first motion request, when the first motion request is received.

The storage unit 95 need not store the restriction RE of the brake device 40. In this case, the generation unit 94 may generate an instruction value of an operation request that makes the braking force of the brake device 40 greater than the upper limit value, even when the first motion request is received.

The storage unit 95 need not store the type information of the brake device 40. For example, it is only necessary that the instruction value generated by the generation unit 94 is adjusted in accordance with the type and the structure of the brake device 40 that is included in the vehicle 10.

The brake control unit 96 may stop outputting the specific instruction value when another vehicle did not collide with the vehicle 10 after outputting the specific instruction value of the above embodiment. Specifically, it is assumed that a signal indicating that another vehicle did not collide with the vehicle 10 during a period from the time when the first motion request was input to the brake ECU 90 until a predetermined time elapsed is input to the brake ECU 90. By receiving this signal, the brake control unit 96 may stop outputting the specific instruction value.

What is claimed is:

1. A motion manager configured to be mounted on a vehicle, the motion manager comprising:
   one or more processors configured to:
      receive a motion request generated by an application that interprets sensor data to detect a potential collision, the motion request representing an application-level determination distinct from a sensor output; and
      generate an instruction value of an operation request for a brake control unit that controls a brake device, based on the received motion request and a restriction corresponding to a type of the brake device mounted on the vehicle,
   wherein the one or more processors are further configured to
      receive, from the application that has determined that an object will collide with the vehicle, the motion request indicating that an additional braking force is needed, when the vehicle is stopped, and
      generate the instruction value for causing the brake device to generate a greater braking force than before the motion request is received, when the motion request indicating that the additional braking force is needed is received.

2. The motion manager according to claim 1, further comprising
   one or more memories that store, in advance, type information of the brake device to be controlled by the brake control unit,
   wherein the one or more processors are configured to generate the instruction value based on the type information of the brake device stored in the one or more memories, when the one or more processors have received the motion request.

3. The motion manager according to claim 2, wherein:
   the type information includes the restriction of the brake device;
   the restriction includes information on an upper limit value of a braking force that the brake device is able to output; and
   the one or more processors are configured to generate the instruction value so as to set the braking force of the brake device to the upper limit value or less, when the one or more processors have received the motion request indicating that the additional braking force is needed.

4. The motion manager according to claim 2, wherein the one or more processors are configured to generate the instruction value based on the type information so as to set the braking force of the brake device to a braking force that is predetermined as a braking force for locking a rotation of wheels of the vehicle, when the one or more processors have received the motion request indicating that the additional braking force is needed.

5. The motion manager according to claim 1, wherein the one or more processors are configured not to generate the instruction value according to the motion request indicating that the additional braking force is needed, when the vehicle is not stopped.

6. The motion manager according to claim 1, wherein the one or more processors are further configured to:
   arbitrate a plurality of motion requests that has been received; and
   when receiving the motion request indicating that the additional braking force is needed, arbitrate by selecting the motion request indicating that the additional braking force is needed, regardless of presence or absence of other motion requests.

7. A control device configured to control a brake device of a vehicle, the control device comprising
   a motion manager that includes one or more processors configured to:
      receive a motion request generated by an application that interprets sensor data to detect a potential collision, the motion request representing an application-level determination distinct from a sensor output; and
      generate an instruction value of an operation request for a brake control unit that controls the brake device, based on the received motion request and a restriction corresponding to a type of the brake device mounted on the vehicle,
   wherein the one or more processors are further configured to
      receive, from the application that has determined that an object will collide with the vehicle, the motion request indicating that an additional braking force is needed, when the vehicle is stopped, and
      generate the instruction value for causing the brake device to generate a greater braking force than before the motion request is received, when the motion request indicating that the additional braking force is needed is received.

8. A control method executed by a computer mounted on a vehicle for controlling a brake device of the vehicle, the control method comprising:
   receiving a motion request generated by an application that interprets sensor data to detect a potential collision, the motion request representing an application-level determination distinct from a sensor output; and generating an instruction value of an operation request for controlling the brake device, based on the received motion request and a restriction corresponding to a type of the brake device mounted on the vehicle, wherein the control method includes receiving, from the application that has determined that an object will collide with the vehicle, the motion request indicating that an additional braking force is needed, when the vehicle is stopped, and generating the instruction value for causing the brake device to generate a greater braking force than before the motion request is received, when the motion request indicating that the additional braking force is needed is received.

* * * * *